Oct. 25, 1932.  C. A. NICKLE  1,884,140
SHADED POLE MOTOR
Filed Feb. 25, 1931  2 Sheets-Sheet 1

Inventor:
Clifford A. Nickle,
by Charles E. Mullan
His Attorney.

Oct. 25, 1932.  C. A. NICKLE  1,884,140
SHADED POLE MOTOR
Filed Feb. 25, 1931  2 Sheets-Sheet 2
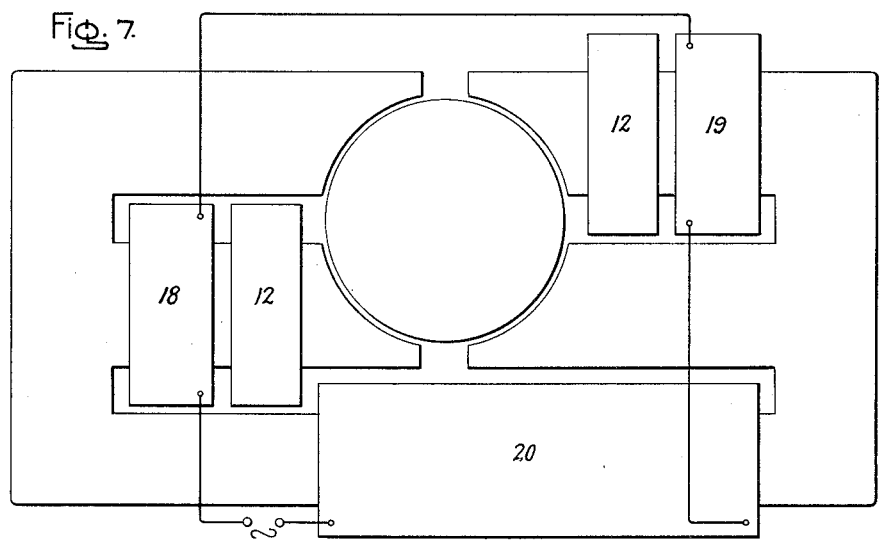
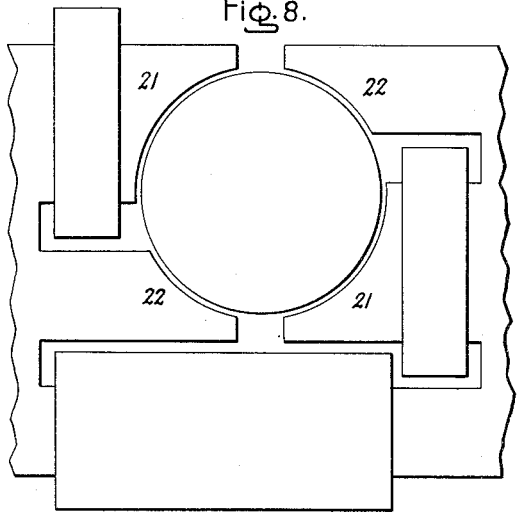
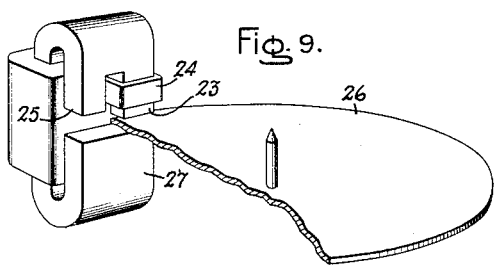
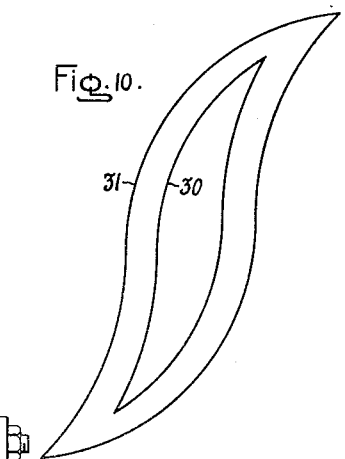
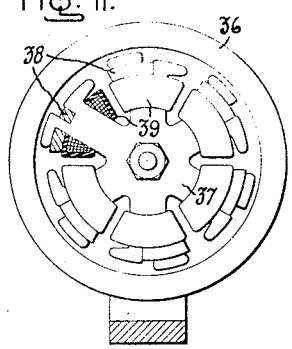
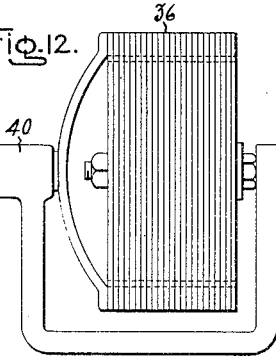
Inventor:
Clifford A. Nickle,
by Charles E. Tullar
His Attorney.

Patented Oct. 25, 1932

1,884,140

UNITED STATES PATENT OFFICE

CLIFFORD A. NICKLE, OF SCHENECTADY, NEW YORK, ASSIGNOR TO GENERAL ELECTRIC COMPANY, A CORPORATION OF NEW YORK

SHADED POLE MOTOR

Application filed February 25, 1931. Serial No. 518,151.

My invention relates to shaded pole motors and its object is to provide such motors with a more perfect rotating magnetic field than has been heretofore available, resulting in increased efficiency and, where the motor is of the synchronous type, a higher degree of synchronous stability.

In the conventional shaded pole motor the fluxes from the shaded and unshaded pole halves are unequal. The flux from the shaded half of the pole is materially less than that from the unshaded pole half. This is because the shading coil has resistance and energy is required to induce a current therein. This has the effect of increasing the reluctance of the flux path therethrough and reducing the flux in comparison to that in the unshaded pole portion. This difference in the magnitude of the fluxes in the shaded and unshaded portions of the pole pieces results in a magnetic field which is far from being uniformly rotating in character and the primary object of my invention is to provide a shaded pole motor in which the fluxes of the shaded and unshaded pole portions are substantially equal, thereby improving the character of the rotating magnetic field and characteristics of the motor. The invention permits of a greater angle of flux lag between the shaded and unshaded pole portions than has heretofore been practicable, which in itself improves the rotary character of the field. The invention is particularly beneficial in small self-starting synchronous motors of the hysteresis type for reasons which will be hereinafter explained.

Figure 1:
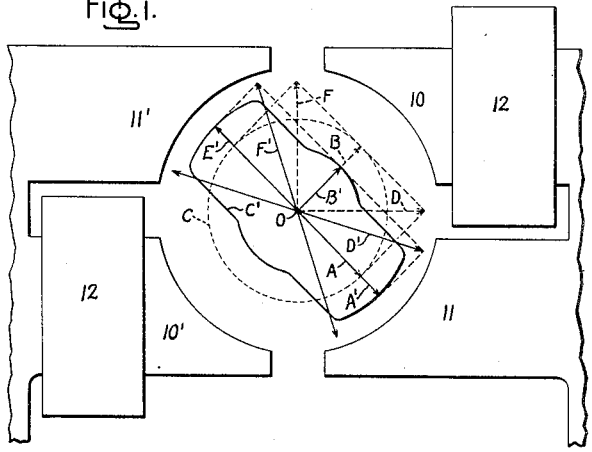
Figure 4:
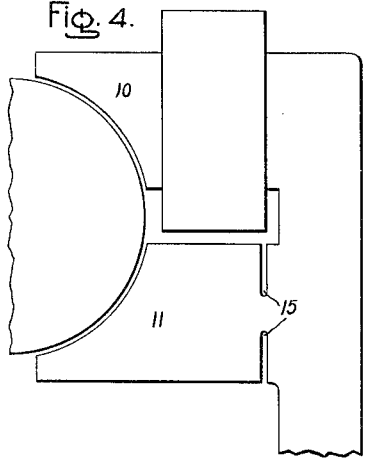
Figure 2:
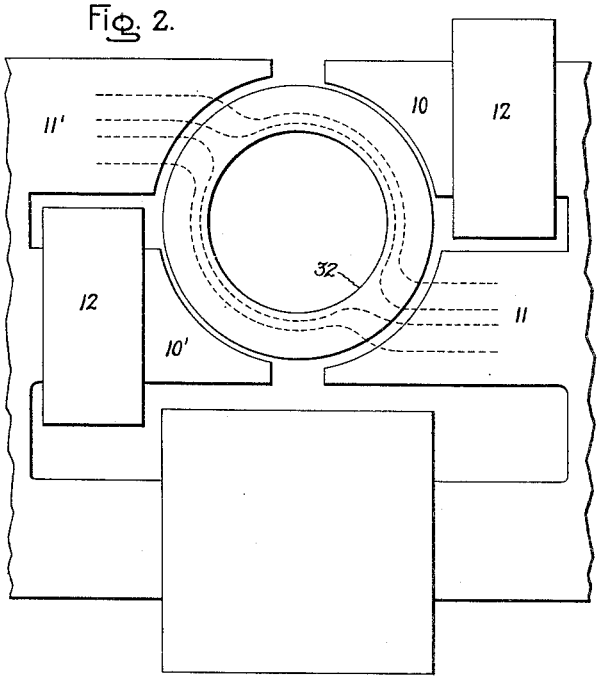
Figure 5:
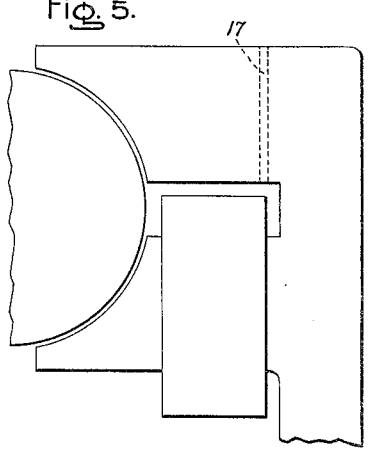
Figure 6:
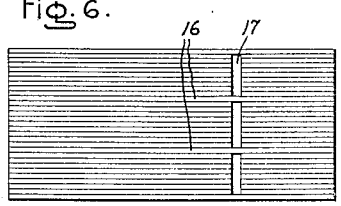

The features of my invention which are believed to be novel and patentable will be pointed out in the claims appended hereto. For a better understanding of my invention and some practicable applications thereof, reference is had in the following description to the accompanying drawings. Fig. 1 represents the pole pieces of the conventional 2-pole shaded pole motor, together with flux vector relations in the rotor space explanatory of the non-uniformity of the rotating magnet field occasioned by unequal fluxes from the shaded and unshaded pole portions; Fig. 2 shows a method of equalizing the shaded and unshaded pole fluxes by employing smaller air gaps at the shaded poles than at the unshaded poles. This figure also shows the beneficial flux distribution produced by using a rotor for hysteresis motor in which the magnetic material is of an annular cylindrical shape, the complete rotor being shown in Fig. 3; Figs. 4 and 5 show means of equalizing the fluxes in a motor having equal rotor air gaps at the shaded and unshaded poles; Fig. 6 is a partial top view of the unshaded pole shown in Fig. 5; Fig. 7 shows a flux equalizing scheme employing auxiliary exciting coils to force the flux through the shaded poles; Fig. 8 is a flux equalizing scheme using unequal pole areas and unequal flux densities in the shaded and unshaded pole sections; Fig. 9 shows the application of the invention to a disc rotor motor; Fig. 10 shows hysteresis curves to be referred to in explaining the desired flux distribution of the rotor in a hysteresis motor; and Figs. 11 and 12 show partial end and side views of my invention as applied to a motor of the umbrella construction.

In explaining my invention I will first point out the reason for the unequal fluxes in the shaded and unshaded portions of the conventional motor and why such unequal fluxes are detrimental.

In Fig. 1, I have represented the pole pieces of the usual single phase bipolar shaded pole motor, the shaded poles being represented at 10 and 10', the unshaded poles at 11 and 11' and the shading coils at 12. In place of the rotor I have represented curves and vectors representative of flux relations now to be discussed. For the purpose of the present discussion it will be assumed that the center of the pole faces are 90 degrees apart and that the flux in shaded areas 10 lags the flux in the unshaded areas 11 by exactly 90 degrees. If now the flux density at the pole faces 10 and 11 were equal we could represent the magnitude of the fluxes by the equal vectors A and B and visualized as rotating at a uniform speed in a counter-clockwise direction about the center point O tracing an imaginary perfect rotary magnetic field represented by the dotted circle C. The average resultant flux during the half cycle represented could then be represented by the vector D. However, owing to the added reluctance of the magnetic circuit through the poles 10 due to the presence of the shading coils 12 the fluxes at 10 and 11 are unequal, more flux passes through 11 than through 10, as represented by the vectors A' and B' respectively. A' represents the average flux through pole faces 11 during the first quarter of a cycle. B' represents the average flux through pole faces 10 during the second quarter of the cycle, and D' represents the average resultant flux of the motor both in magnitude and in space over the half cycle in question. Now, let us consider the flux relations over the second and third quarter cycles. As before, B' represents the average flux of pole face 10 over the second quarter cycle and E' the average flux of pole face 11' over the third quarter cycle and the resultant for this half cycle is represented by the vector F', whereas if the shaded and unshaded pole fluxes had been equal the resultant average flux of this half cycle would be represented by vector F. C' represents the line traced by the variable quarter cycle flux vector as it passes from position A' B' E' and around to A' again during a complete cycle.

It will be noted that during the first half cycle discussed the average actual motor flux represented by D' is behind the position of the theoretically perfect average motor flux represented by D, whereas a quarter of a cycle later the average actual motor flux represented by F' is ahead of the theoretically perfect average motor flux represented by F. In other words, if a magnetic bar rotor were placed in the theoretically perfect field it would rotate from position D to position F in a quarter of a cycle without tending to accelerate or decelerate at any point from true synchronous speed, but if placed in the actual field it would tend to slow down opposite the unshaded poles where the flux is strongest and speed up opposite the shaded poles where the flux is weakest and so tend to aline itself with the average actual flux which in effect revolves at a non-uniform speed over a cycle period. It is seen therefore that although the spacing of the stator poles and angle of phase shift produced by the shading coils may be perfect the resultant rotating magnetic field is not perfect unless the flux about the rotor is uniform. Of course I do not mean to contend that the prior shaded pole motors are inoperative because of this defect. Synchronous shaded pole motors of this type have given good service. The effect of the non-uniform character of the field has been offset to some extent by using rotors having small inertia, by the use of large air gaps between stator and rotor, by allowing excessive flux leakage between the pole faces, by employing motor torques in addition to the true synchronous torque. In all cases however, the efficiency of the motor and its synchronous torque characteristics have not been as good as is now possible by means of my invention.

One way to make the fluxes of the shaded and unshaded pole faces equal is to make the air gap between the rotor and the shaded pole faces less than the air gap at the unshaded pole faces as shown in Fig. 2 by an amount which for a given shading coil will make the fluxes equal. Even with correct angle of lag the field will not be perfect because of the notches in the pole faces between the shaded and unshaded portions and the air gaps between opposite poles. However, the field of this new motor is far superior to the shaded pole motor of the prior art where no consideration was given to the decrease in flux through the shaded pole halves due to the presence of the shading coil.

It is no longer necessary to employ inefficient expedients to offset the non-uniformity of the field since I have largely corrected the difficulty at its source, so to speak. The air gap between rotor and stator may now be made small and a greater portion of the motor flux utilized in producing torque. The gain in efficiency in the synchronous hysteresis motor with a proper type of rotor is truly remarkable. At best, the efficiency of the small self-starting synchronous hysteresis motors now on the market is extremely low, being less than one per cent. By the use of the above described feature of my invention I have demonstrated that the efficiency of such motors may be increased by several hundred per cent.

In the discussion of Fig. 1, it was assumed that we had a 90 degree phase lag. It is of course impossible to obtain so great a phase lag with a shading coil since this would require a shading coil of pure reactance and no resistance. In the conventional motor the flux through the shaded pole portion decreased as the angle of lag was increased so that it was necessary to use a relatively small angle of phase lag in order to have any magnitude of flux in the shaded pole portion. In general, the angle of lag was about 40 degrees. Now, any decrease in the angle of phase lag below 90 degrees in the fields pictured in Fig. 1 will have a further unbalancing effect in the same general direction as that produced by unbalanced fluxes as will be evident by assuming the extreme case of zero phase lag.

In my motor it is also necessary to use an angle of phase lag less than 90 degrees but since I make the shaded and unshaded fluxes equal regardless of the phase angle used I am not limited in the selection of the angle of phase lag because of any unbalancing effect on the magnitude of the fluxes in the shaded and unshaded pole portions as in the conventional motor. I may therefore increase the angle of phase lag toward the ideal 90 degree relation until I am limited by other considerations having to do with the size of the shading coil and the excitation energy it is practicable to expend in forcing flux therethrough. Thus far, my experiments indicate that employing equal fluxes in the two portions of the poles, the most desirable phase angle to use for a given size and cost of motor is between 40 and 60 degrees. As indicated above, this greater angle of lag in itself improves the uniformity of the rotating magnetic field. Thus, I have entirely removed one of the causes of non-uniformity in the rotating magnetic field of the shaded pole motor, namely that produced by unequal fluxes in the two portions of the pole pieces and partially removed another cause by increasing the angle of phase lag.

Figs. 4, 5 and 6 illustrate other ways of equalizing the effective reluctances of the two pole halves and producing equal fluxes keeping the rotor air gap uniform. In Fig. 4 the laminations of the unshaded pole 11 are partially cut through forming air gaps at 15. In Figs. 5 and 6 the same result is obtained by partially separating the unshaded pole from the main portion of the stator iron by leaving only a few of the laminations 16 extend between the two portions, the remaining laminations being separated by an air gap 17.

In Fig. 7 I have illustrated still another way of making the fluxes of the shaded and unshaded pole portions equal without altering the rotor air gaps or making equivalent air gaps in the stator laminations. Here the additional energy necessary to force the same amount of flux through the shaded pole portions as through the unshaded pole portions is supplied by additional exciting coils 18 and 19 mounted on the shaded pole portions back of the shading coils. These auxiliary exciting coils are connected in series or otherwise with the usual main coil 20 in such manner as to produce fluxes in the same direction through the rotor at any instant.

In Fig. 8, another way of keeping the fluxes in the two portions of the pole pieces equal is represented. Here the unshaded portions 22 of poles are made smaller than the shaded portions 21 by an amount such that the flux density in the shaded pole times its area is equal to the flux density in the unshaded pole times its area. By operating the pole pieces 22 at a relatively high flux density approaching saturation and selecting the proper relations, the reluctance of the flux path therethrough may be made equivalent to the effective reluctance of the flux path through the shaded pole pieces so that the fluxes will be approximately equally divided.

The particular modifications represented in Figs. 7 and 8 are the inventions of Wayne J. Morrill, described in copending application Serial No. 518,510, filed February 25, 1931, assigned to the same assignee as the present invention, but are included in the broad scope of my invention of making the fluxes in the shaded and unshaded pole pieces substantially equal. It will also be apparent to those skilled in the art that two or more of the schemes herein described may be used in the same motor, obtaining part of the flux equalization by one scheme and the remainder of the flux equalization by another scheme or schemes.

In Fig. 9 I have represented my invention applied to a motor where the rotor 26 is of the disc type, the greater portion of the disc being cut away to better show the stator pole pieces. Here also it is beneficial for the shaded and unshaded fluxes to be equal. The pole portion 23 surrounded by the shading coil 24 is longer than the unshaded portion 25 and consequently the air gap between the lower pole pieces 27 and 23 is less than between 27 and 25, resulting in equal fluxes through both portions. If the disc rotor is of the induction type, out of phase eddy currents are produced therein under the different pole sections by the out of phase fluxes. The eddy current produced by the leading flux reacts with the lagging flux and vice versa to produce torque. It will be evident that the maximum torque will be produced when the two out of phase fluxes are equal in magnitude. The shading of the flux and the equalizing expedient may be divided between the upper and lower pole pieces if desired and additional stator elements may be added about the disc, as is customary.

The single phase shaded pole motor, owing to its simplicity, has been extensively used in small sizes in connection with a rotor designed to be self starting and synchronous in operation. My invention makes possible a considerable improvement in this type of motor because of the greatly improved character of the rotating magnetic field. A plain cylindrical steel rotor in the field such as produced by the conventional shaded pole field structure is not very satisfactory because if it operates synchronously at all, it has a very low useful synchronous torque. It has therefore been customary heretofore to use salient poles on the rotor or to use some form of rotor designed to have some salient pole effect. This improves the useful synchronous torque to a limited extent but decreases the useful starting torque since any salient pole effect tends to produce a locking torque at standstill which is more pronounced the greater the nonuniformity in the rotating magnetic field. As a result of these two difficulties the small self-starting synchronous shaded pole motor of the prior art has been extremely low in efficiency and useful only for driving devices having low maximum torque requirements both at starting and at synchronous speed.

By means of my invention I have so improved the character of the rotating magnetic field that with the same size of motor I can obtain a very much higher torque at all speeds, including standstill, with or without any salient pole effect. Locking torque at standstill still exists in my motor if made with salient poles, although it is not so pronounced. It is therefore preferable to make the rotor without salient poles and depend upon the formation of permanent poles in the steel rotor for synchronous operation. Such a motor becomes a pure hysteresis motor without any locking torque at standstill. The maximum synchronous torque, as well as the starting torque, depends upon the hysteresis loss per cycle in the rotor. The rotor material should be selected with a view of having the hysteresis loss as high as possible consistent with the available maximum field strength. A hardened steel should therefore be selected and I have found chrome steel satisfactory for this type of motor rotor. To obtain maximum output of hysteresis motors the rotor material should be saturated. This is evident from the hysteresis loop represented in Fig. 10. The loop for a given maximum flux density is represented at 30. With a higher maximum flux density the loop is as represented at 31. Thus, at a high flux density we obtain a greater hysteresis loss and retentivity in relation to the excitation than at a lower flux density. It is therefore desirable that the magnetic material of the rotor through which the torque fluxes pass should be saturated.

Figure 3:
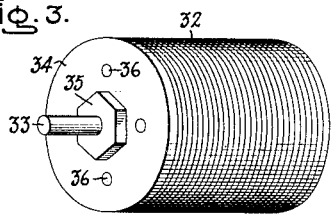

To obtain the greatest torque for a given excitation within practicable limit of design, I have found that the non-salient pole rotor for a hysteresis motor may advantageously be built with the magnetic material in the form of an annular laminated cylinder as shown in Fig. 2. In this figure the shaft and support for the annular rotor laminations have been omitted to better illustrate the preferred disposition of the magnetic material. If we consider the motor fluxes at the instant when the flux axis is between unshaded pole halves the flux paths through the rotor will be in general as represented in the dotted lines. It is seen that with the annular shaped rotor the density of the flux is approximately equal at all points through the rotor, whereas if the rotor were solid the flux density adjacent the active pole tips would remain about the same but the density through the central portion of the rotor where flux could spread would be very much less. Thus with a solid rotor and with the same stator flux density we would obtain the benefit of saturation only at the points adjacent the active pole tips, but with the annular shaped rotor I may obtain the benefit of saturation throughout the flux path of the rotor, and moreover I make this flux path longer than with the solid rotor and obtain the benefit of this longer path also. From the above it will be seen that in the hysteresis rotor the annular shape has distinct advantages without producing any salient pole effect and tendency to lock at standstill. Owing to the more uniform rotation of the field in my motor it is unnecessary to make the rotor of low inertia or to use such a high flux density in the rotor space as to obtain a smoothing out effect in the irregularities of the rotating field. I have found it feasible to use the same axial dimensions in the magnetic material of the rotor as in the stator and thus the rotor may be built with dimensions as represented in Fig. 3. Such a rotor comprises a stack of annular shaped laminations 32 secured to the shaft 33 in any suitable manner so as not to seriously interfere with the magnetic characteristics above explained. The laminations may be suitably clamped between non-magnetic end plates 34 with nuts 35. Non-magnetic bars 36 may be riveted between the plates and rest against the inner periphery of the rotor laminations. To increase the magnetic density in the rotor the magnetic laminations may be alternated with non-magnetic laminations made of paper for example. I have tried both arrangements and have found that the torque advantages gained by using part non-magnetic laminations are generally not sufficient to warrant the additional complication although for certain purposes such an expedient may be desirable. The rotor flux density of course varies with the excitation and with the rotor air gap dimensions. The minimum air gap dimension is limited only by mechanical clearance considerations and in general the maximum air gap may be made considerably less than in prior hysteresis motors where a large air gap was employed for the purpose of partially offsetting the effect of the unequal flux distribution.

The preferred high substantially uniform flux density in the rotor previously discussed makes it practicable to make the synchronous hysteresis motor with the rotor 36 outside, and the stator 37 inside, as illustrated in Figs. 11 and 12. I have shown a 6-pole stator with the shaded portion being longer than the unshaded portion of such poles so as to produce equal fluxes. The shading and exciting coils are indicated at 38 and 39 respectively. The rotor bearing is at 40. I have built vertical shaft motors of this character embodying my invention for operating traffic control apparatus.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. An alternating current motor having relatively rotatable field and armature members, the field member having salient poles split into halves, shading coils on one-half of each pole, means for producing alternating fluxes through said poles, and means for maintaining the flux in the halves of the poles substantially equal.

2. An alternating current motor having relatively rotatable field and armature members, the field member having shaded and unshaded pole portions separated from the armature member by unequal air gaps, the inequality in such air gaps being such as to substantially compensate for the difference in the effective reluctances of the shaded and unshaded pole portions.

3. An alternating current motor provided with relatively rotatable field and armature members, the field member having divided pole portions adjacent the armature providing parallel flux paths therethrough, shading means for causing the flux through one path to lag behind that in the other path, said means tending to reduce the flux through the shaded flux path, the actual reluctances of the unshaded flux path being greater than the shaded flux path to the extent necessary to substantially compensate for the flux reducing effect of the shading means and cause the fluxes in both paths to be substantially equal.

4. An alternating current motor comprising a field element provided with salient poles separated by an air gap, a disc rotor armature member between said poles, exciting means for causing an alternating flux between said poles and through said armature, means for causing the flux through one portion of a pole to lag behind that in another portion, and means for maintaining the fluxes in both of said portions substantially equal.

5. An alternating current motor, a stator field member having salient poles, each divided into two portions, exciting means for producing alternating fluxes in said poles, means for causing the flux in one portion to lag behind that in the other, means for causing the fluxes in both pole portions to be substantially equal, and a rotor member for said motor comprising a non-salient pole element of hardened steel proportioned to be saturated by the fluxes from the stator field member.

6. A self-starting synchronous motor comprising a single phase salient pole stator field element, the salient poles being divided into two portions with shading coils on one portion of each pole, means for causing the fluxes in the shaded and unshaded pole portions to be substantially equal, a rotor for said motor made of hardened steel and of annular shape without salient poles, the annular portion extending between different poles of the stator, the cross-section of the annular portion being such as to be saturated by the fluxes between the salient poles.

7. A self-starting synchronous motor comprising a single phase stator field element provided with shaded salient poles arranged for maintaining the shaded and unshaded fluxes thereof substantially equal, a hysteresis rotor therefor, the magnetic material of which comprises a plurality of annular steel laminations forming a cylindrical saturated path for the fluxes between different poles of the stator.

8. A motor having a field element with one or more salient poles divided into sections, means for producing alternating fluxes through such sections, a shading coil on one of such sections, the shading coil causing an increase in the effective reluctance of the shaded pole section, and means for compensating for such effect of the shading coil to maintain the fluxes in the shaded and unshaded pole sections substantially equal.

9. An alternating current motor having a field element provided with salient poles, said poles being divided into two portions at the pole tips, shading coils surrounding one such portion of each pole, an armature mounted between the salient poles of the field element, the air gaps between the armature and the shaded and unshaded salient pole portions being equal and the unshaded pole portions being separated from the remainder of the field structure by partial air gaps proportioned to maintain the fluxes in the shaded and unshaded pole portions substantially equal.

10. A self-starting synchronous motor of the hysteresis type comprising an inner field element provided with a plurality of radial salient poles, said poles having their pole faces divided into two portions of unequal radial lengths, shading coils surrounding the portions of the greatest radial length, an exciting winding on said poles connected to produce fluxes of alternate polarity in adjacent salient poles and an armature surrounding said field element comprising an annular cylindrical shaped body of hardened steel of such cross-section as to become substantially saturated by the fluxes between the salient poles.

In witness whereof, I have hereunto set my hand this 24th day of February, 1931.

CLIFFORD A. NICKLE.